No. 821,461. PATENTED MAY 22, 1906.
R. CONRAD.
BALL BEARING.
APPLICATION FILED MAY 10, 1904.

WITNESSES:
Fred White
René Ruine

INVENTOR:
Robert Conrad,
by his Attorneys
Arthur E. Fraser & Co.

No. 821,461. PATENTED MAY 22, 1906.
R. CONRAD.
BALL BEARING.
APPLICATION FILED MAY 10, 1904.
2 SHEETS—SHEET 2.
 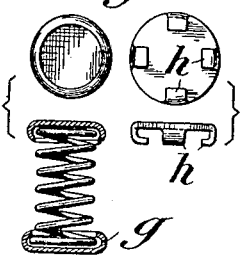 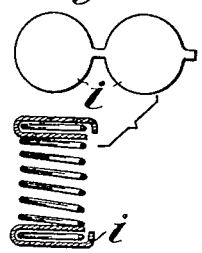 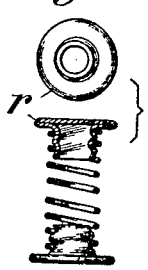
Fig. 9.   Fig. 10.   Fig. 11.   Fig. 16.
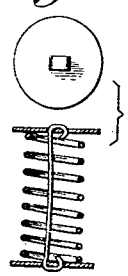   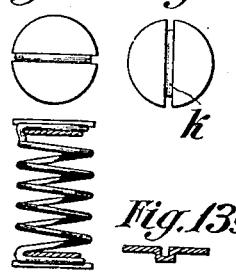      
Fig. 12.   Fig. 13ᶜ. Fig. 13ᵃ.   Fig. 14.   Fig. 17.   Fig. 18.
Fig. 13ᵇ.   Fig. 15.   Fig. 19.
Fig. 13.
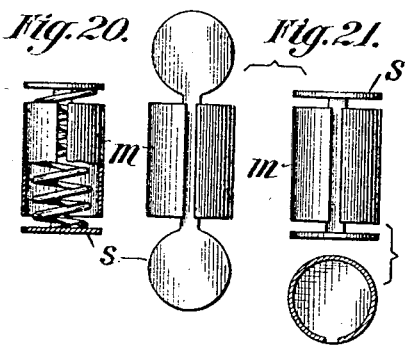 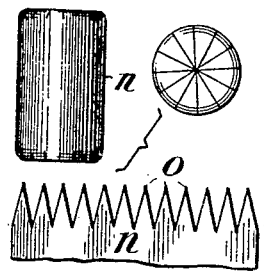
Fig. 20.   Fig. 21.   Fig. 22.
WITNESSES:
Fred White
René Muine
INVENTOR:
Robert Conrad,
By his Attorneys
Arthur C. Fraser & Co.

UNITED STATES PATENT OFFICE.

ROBERT CONRAD, OF BERLIN, GERMANY.

BALL-BEARING.

No. 821,461.      Specification of Letters Patent.      Patented May 22, 1906.

Application filed May 10, 1904. Serial No. 207,330.

*To all whom it may concern:*

Be it known that I, ROBERT CONRAD, engineer, a subject of the German Emperor, residing at 248 Kurfürstendam, Berlin, in the Empire of Germany, have invented certain new and useful Improvements in Ball-Bearings, of which the following is a specification, reference being had to the drawings hereunto annexed and to the letters marked thereon.

The invention relates to that class of ball-bearings which are provided with ordinary helical springs placed between the balls. These springs, which may be employed in connection with all kinds of ball-bearings, are of considerable advantage, as they conduce to the silent working of said bearings and render the same strong enough to bear not only heavy shocks, variations of pressure, and the like, but also the strain produced by the careless mounting of the bearing, or from other causes, as compared with ball-bearings in which the balls run immediately in contact with one another. Simple helical springs, however, are liable to cause increased friction, and not infrequently they break or become bent out of shape when a ball is broken, in consequence of which they become jammed in the space between the balls and their path, thus causing an obstruction. This invention obviates these disadvantages by providing for the use of disks, caps, pistons, or the like, preferably forming substantially closed walls, which while approximately fitting between the running-surfaces of the ball-bearings are intended to come into contact with the balls in such manner that each ball is furnished on both sides with a disk, piston, or the like, such disks and the like being each placed between two adjacent balls and either under spring-pressure or more or less rigidly connected with one another.

Figure 1 shows part of a ball-bearing provided with an inner ring $b$, an outer ring $a$, balls $c$, and disks $d$. This invention renders the kind of ball-bearing and the shape of the running path or race immaterial. In the application of this principle the centrally-working pressure of a spring is effective in the space $x$ between the two disks $d$, as indicated by the arrows in the drawing. In this case it is of no consequence if the pressure is produced by a flat spring or by a helical spring or the like, and it is quite immaterial whether the disks $d$ possess more or less elasticity.

Fig. 2 represents a modification in the principle of the invention wherein the plain disk $d$ is replaced by cap-like disks $e$.

Fig. 3 illustrates a modification of the principle of the invention wherein the pressure of the spring does not act in the axial or central direction, but wherein the disks, caps, or the like are forced asunder at points out of said axial line. Finally, the disks or the like may also be connected with one another and kept asunder by nearly-rigid devices, and it is not always necessary that they should come exactly in contact with the balls, as, also in this case, said disks, caps, or the like are of great service in diminishing the friction and for giving increased safety against the injurious effect of broken balls, and so on. In such case, however, the noise caused by the action of the devices would be greatly increased.

Figs. 4 to 22, inclusive, represent a series of ball-separating devices adapted to be placed between the balls inside the ball-bearing. All these figures show each two disks, caps, or the like designed to come in contact with the balls. The springs or the elements which are placed between each pair of disks, caps, or the like in these cases may be either made in one piece with the disks, caps, or the like, or they may be suitably connected with the same.

Fig. 4 illustrates a modification in which a flat spring is arranged between the disks, being made of one and the same piece of metal as the disks themselves. The shape, number, and kind of the bent metal are immaterial in this and all the other modifications represented by the figures. Fig. 5 shows a similar device having a flat or bowed spring. In lieu thereof an element of a somewhat rigid nature could be employed, if desired.

Fig. 6 represents a modification in which a helical spring forms one piece with the disks.

In Figs. 7 and 8 devices are illustrated in which the disks themselves are made of the same wire as the springs.

Fig. 9 illustrates a modification in which the extremities of the spring are bent and fastened into the disks.

In Fig. 10 a device is shown in which a helical spring engages (in some cases without other fastenings) a cap or like disk. The end convolution $g$ of the spring is held in an inward flange spun or otherwise formed around the edge of the disk. A modification of this example is shown at $h$, the disk being in this case provided with lugs or extensions forming clips, the ends of which are bent over.

Fig. 11 represents a modification in which a stamped sheet $i$ of metal is bent over so as to form a double disk for firmly embracing the end of the wire.

Fig. 12 shows a device in which a helical spring is placed without any connection between two disks, the latter, however, being connected with one another by a length of wire or a bar of metal.

Fig. 13 represents a device in which the disks are provided with a recess, cavity, or groove extending diametrically across for the reception of the bent extremities of the spring and in which the bent part of the disk forming the recess is cut off at each end of the recess, so as to correspond with the thickness of the wire of the spring.

In Fig. 13$^a$ an outside face view of one of the disks is shown, but without the spring. Fig. 13$^b$ gives an edge view of the same disk. Fig. 13$^c$ gives a similar view of the same, but in combination with the spring, as shown at Fig. 13. Fig. 14 is a perspective view of this disk. Fig. 15 shows a very similar disk, the bent wire, (not shown,) however, not being placed in a recess in the disk, but simply engaging the latter by means of a simple notch $k$ in the disk; but two or more such notches could be arranged therein.

In the example shown at Fig. 16 caps or the like $r$ are employed, onto which a helical spring is screwed. The ends of this spring may be bent, as shown at Fig. 16, and introduced into perforations in the caps in order to secure the same against working apart. Fig. 17 shows a similar arrangement, the caps or capsules having, however, no screw-threads, but having smooth surfaces.

Figs. 18 and 19 represent modifications which in principle do not differ from that of Fig. 17; but the caps or the like are longer in proportion to the whole length of the device and telescopically overlap one another. In Fig. 18 the helical spring, which could be replaced by any other suitable spring, is arranged outside the caps, while in Fig. 19 the spring is placed inside the caps.

Figure 1:
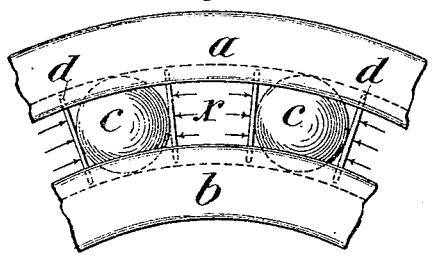
Figure 2:
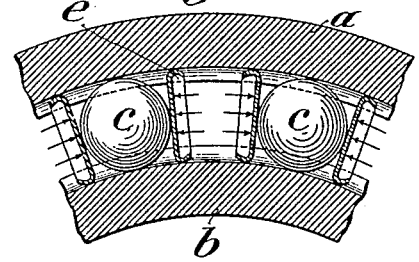
Figure 4:
Figure 3:
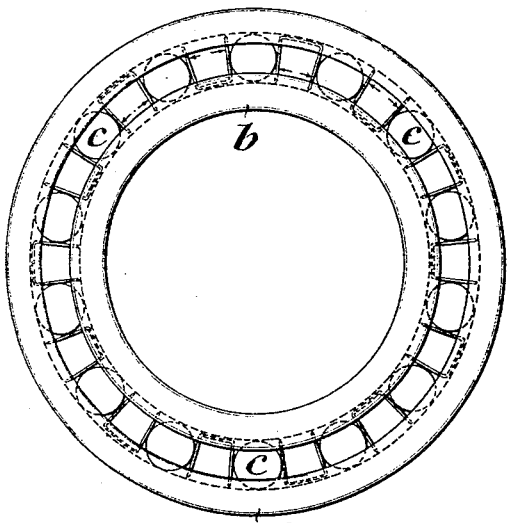
Figure 5:
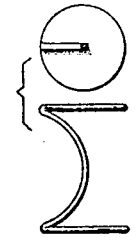
Figure 7:
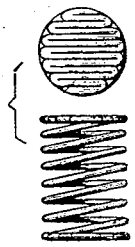
Figure 6:
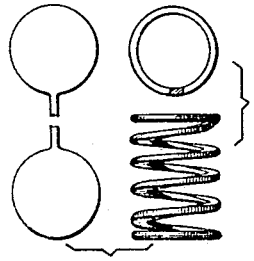
Figure 8:
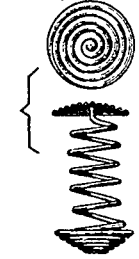

The examples shown at Figs. 20, 21, and 22 correspond in principle with the modification illustrated in Fig. 3, since, particularly in Figs. 20 and 21, the disks $s$ are formed with integral side extensions which are bent so as to form a casing $m$ and are slightly elastic when they are bent at an angle. These elastic parts may be reinforced, as shown in Fig. 20, by a helical spring or by any other spring placed in the casing $m$. In the device shown in Fig. 22 a similar casing $n$ is represented, (the lower part of the figure showing it unrolled or developed,) which is provided with tongues $o$ instead of disks. When required for use, this casing is rolled up and the tongues are bent in such manner that they form together a kind of split disk at each end of the device, as represented at the upper part of said figure.

It is obvious that with this invention disks of other construction than that hereinbefore described may also be employed as end plates with all kinds of separating devices. All the devices described above may also be used with great advantage, and especially in bearings with two running-surfaces and no filling-apertures.

The parts are assembled by displacing the rings $a$ and $b$ eccentrically, so that there is a space between the edges of the rings sufficient to permit the insertion of the number of balls somewhat less than would be required to extend continuously around the grooves in the normal position. The rings are then restored to their normal concentric positions and the distance-pieces inserted between the balls, the distance-pieces being of sufficient size to distribute the balls entirely around the raceway. The distance-pieces are inserted by compressing the spring and introducing the compressed piece sidewise into the groove and there turning it to its normal position and releasing it to allow the spring to expand.

I claim as my invention—

1. In a ball-bearing, the combination with the balls, of intermediate devices forming substantially closed walls in contact with the balls, a pair of such devices being between each pair of balls and the devices of such pair being pressed apart yieldingly.

2. In a ball-bearing, the combination with the balls, of intermediate devices forming substantially closed walls in contact with the balls, a pair of such devices being between each pair of balls, and a yielding body between and attached to the devices of such pair.

3. In a ball-bearing, the combination with the balls, of intermediate devices of substantially disk shape in contact with the balls, a pair of such devices being between each pair of balls and the devices of each such pair being pressed apart yieldingly.

4. In a ball-bearing, the combination with the balls, of intermediate devices forming substantially closed walls in contact with the balls, a pair of such devices being between each pair of balls, and a yielding body between and attached to the devices of such pair, each extremity of the yielding body employed engaging with a recess arranged in said devices.

5. In a ball-bearing, the combination with the balls, of intermediate devices forming substantially closed walls in contact with the balls, a pair of such devices being between each pair of balls, and a yielding body between and attached to the devices of such pair by a non-rotative connection so as to prevent relative movement of said devices and the yielding body.

ROBERT CONRAD.

Witnesses:
 HENRY HASPER,
 WOLDEMAR HAUPT.